(12) United States Patent
Sun et al.

(10) Patent No.: US 11,086,621 B2
(45) Date of Patent: Aug. 10, 2021

(54) SYSTEM AND METHOD FOR BLOCKCHAIN-BASED DECENTRALIZED APPLICATION DEVELOPMENT

(71) Applicant: ALIPAY (HANGZHOU) INFORMATION TECHNOLOGY CO., LTD., Zhejiang (CN)

(72) Inventors: Shanlu Sun, Hangzhou (CN); Shubo Li, Hangzhou (CN)

(73) Assignee: ALIPAY (HANGZHOU) INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/086,350

(22) Filed: Oct. 31, 2020

(65) Prior Publication Data

US 2021/0049009 A1 Feb. 18, 2021

Related U.S. Application Data

(63) Continuation of application No. PCT/CN2019/116649, filed on Nov. 8, 2019.

(51) Int. Cl.
*G06F 8/77* (2018.01)
*G06F 8/41* (2018.01)
(Continued)

(52) U.S. Cl.
CPC .............. *G06F 8/77* (2013.01); *G06F 8/42* (2013.01); *G06F 8/447* (2013.01);
(Continued)

(58) Field of Classification Search
CPC ..... G06F 8/20; G06F 8/77; G06F 8/42; G06F 8/447; G06F 11/3684; G06F 11/3688; G06F 21/64
See application file for complete search history.

(56) References Cited

U.S. PATENT DOCUMENTS

| 10,192,073 B2 | 1/2019 | Marin |
| 10,338,913 B2 | 7/2019 | Franchitti |

(Continued)

FOREIGN PATENT DOCUMENTS

| CN | 107274186 A | 10/2017 |
| CN | 107992492 A | 5/2018 |

(Continued)

OTHER PUBLICATIONS

International Search Report and Written Opinion of the International Searching Authority for International Application No. PCT/CN2019/116649, dated Aug. 11, 2020, 7 pages.

(Continued)

*Primary Examiner* — Wei Y Zhen
*Assistant Examiner* — Amir Soltanzadeh

(57) ABSTRACT

Methods, systems, and apparatus, including computer programs encoded on computer storage media, for blockchain-based decentralized application development, are provided. One of the methods includes: generating a blockchain contract and an interface specification associated with the blockchain contract based on a plurality of first inputs; deploying the blockchain contract on a blockchain; generating a client-side application based on a plurality of second inputs and the interface specification associated with the blockchain contract, wherein the client-side application is executable to invoke the blockchain contract deployed on the blockchain; and storing the client-side application in an online storage system.

20 Claims, 7 Drawing Sheets

(51) Int. Cl.
*G06F 11/36* (2006.01)
*G06F 21/64* (2013.01)

(52) U.S. Cl.
CPC ...... *G06F 11/3684* (2013.01); *G06F 11/3688* (2013.01); *G06F 21/64* (2013.01)

(56) References Cited

U.S. PATENT DOCUMENTS

| | | | |
|---|---|---|---|
| 10,445,698 B2 | 10/2019 | Hunn | |
| 10,572,684 B2 | 2/2020 | Lafever et al. | |
| 10,579,825 B2 | 3/2020 | Miller | |
| 10,679,128 B2 | 6/2020 | Katz et al. | |
| 10,700,851 B2 | 6/2020 | Lin et al. | |
| 10,701,054 B2 | 6/2020 | Padmanabhan et al. | |
| 10,708,060 B2 | 7/2020 | Yang et al. | |
| 10,719,771 B2 | 7/2020 | Saxena et al. | |
| 10,728,042 B2 | 7/2020 | Li et al. | |
| 10,789,373 B2 | 9/2020 | Reid et al. | |
| 10,861,112 B2 | 12/2020 | Forbes, Jr. et al. | |
| 2007/0198425 A1 | 8/2007 | Brew et al. | |
| 2014/0139660 A1 | 5/2014 | Zhu et al. | |
| 2015/0379510 A1 | 12/2015 | Smith | |
| 2016/0034547 A1 | 2/2016 | Lerios et al. | |
| 2016/0098562 A1 | 4/2016 | Hawblitzel et al. | |
| 2016/0192192 A1 | 6/2016 | Seedorf et al. | |
| 2016/0253202 A1 | 9/2016 | Dunning et al. | |
| 2017/0024100 A1 | 1/2017 | Pieper et al. | |
| 2017/0103167 A1 | 4/2017 | Shah | |
| 2017/0140408 A1 | 5/2017 | Wuehler | |
| 2017/0352027 A1 | 12/2017 | Zhang et al. | |
| 2017/0364701 A1 | 12/2017 | Struttmann | |
| 2018/0069899 A1 | 3/2018 | Lang et al. | |
| 2018/0088928 A1 | 3/2018 | Smith et al. | |
| 2018/0096175 A1 | 4/2018 | Schmeling et al. | |
| 2018/0096360 A1 | 4/2018 | Christidis et al. | |
| 2018/0157583 A1* | 6/2018 | Bache ................. | G06F 11/3688 |
| 2018/0157688 A1 | 6/2018 | Zessin et al. | |
| 2018/0189732 A1* | 7/2018 | Kozloski ................. | G06F 8/71 |
| 2018/0225194 A1 | 8/2018 | Saleh-Esa et al. | |
| 2018/0260212 A1* | 9/2018 | Wisnovsky ............... | G06F 8/71 |
| 2018/0268386 A1 | 9/2018 | Wack et al. | |
| 2018/0285217 A1 | 10/2018 | Smith et al. | |
| 2018/0285996 A1 | 10/2018 | Ma | |
| 2018/0293578 A1* | 10/2018 | Gardner ................. | G06Q 20/401 |
| 2018/0315141 A1 | 11/2018 | Hunn et al. | |
| 2018/0322491 A1 | 11/2018 | Madisetti et al. | |
| 2018/0343238 A1 | 11/2018 | Tola | |
| 2018/0365201 A1 | 12/2018 | Hunn et al. | |
| 2019/0012249 A1 | 1/2019 | Mercuri et al. | |
| 2019/0034716 A1 | 1/2019 | Kamarol et al. | |
| 2019/0065709 A1 | 2/2019 | Salomon | |
| 2019/0102409 A1 | 4/2019 | Shi et al. | |
| 2019/0102850 A1 | 4/2019 | Wheeler et al. | |
| 2019/0108516 A1 | 4/2019 | Jawaharlal et al. | |
| 2019/0123892 A1 | 4/2019 | Basu | |
| 2019/0180311 A1 | 6/2019 | Chan et al. | |
| 2019/0205873 A1 | 7/2019 | Kamalsky et al. | |
| 2019/0207748 A1 | 7/2019 | Courtney | |
| 2019/0236559 A1 | 8/2019 | Padmanabhan | |
| 2019/0238525 A1 | 8/2019 | Padmanabhan et al. | |
| 2019/0251018 A1* | 8/2019 | Jin ........................ | H04L 9/0637 |
| 2019/0279206 A1 | 9/2019 | Song et al. | |
| 2019/0287107 A1 | 9/2019 | Gaur et al. | |
| 2019/0306173 A1* | 10/2019 | Reddy .................. | H04L 63/126 |
| 2019/0311392 A1 | 10/2019 | Swamidurai | |
| 2019/0349733 A1 | 11/2019 | Nolan et al. | |
| 2020/0019707 A1 | 1/2020 | Zhu et al. | |
| 2020/0034469 A1* | 1/2020 | Sato .................... | G06F 16/1834 |
| 2020/0065761 A1 | 2/2020 | Tatchell | |
| 2020/0082302 A1 | 3/2020 | Zoldi et al. | |
| 2020/0110740 A1 | 4/2020 | Li et al. | |
| 2020/0127845 A1 | 4/2020 | Yang et al. | |
| 2020/0145196 A1 | 5/2020 | Lin et al. | |
| 2020/0151823 A1 | 5/2020 | Shi et al. | |
| 2020/0177373 A1 | 6/2020 | Komandur et al. | |

FOREIGN PATENT DOCUMENTS

| | | |
|---|---|---|
| CN | 108288158 A | 7/2018 |
| CN | 108874372 A | 11/2018 |
| CN | 109634810 A | 4/2019 |
| CN | 109690551 A | 4/2019 |
| CN | 109726206 A | 5/2019 |
| CN | 109766389 A | 5/2019 |
| CN | 109981565 A | 7/2019 |
| CN | 110226168 A | 9/2019 |
| CN | 110263035 A | 9/2019 |
| KR | 101962289 B1 | 3/2019 |
| WO | 2019/179534 A2 | 9/2019 |
| WO | 2019/179537 A2 | 9/2019 |

OTHER PUBLICATIONS

Non-Final Office Action for U.S. Appl. No. 17/128,244 dated Jan. 29, 2021.
Non-Final Office Action for U.S. Appl. No. 17/128,252 dated Mar. 3, 2021.
Written Opinion and International Search Report for PCT Application No. PCT/CN2019/116655 dated Aug. 10, 2020.
Written Opinion and International Search Report for PCT Application No. PCT/CN2020/078747 dated Jul. 8, 2020.
Written Opinion and International Search Report for PCT Application No. PCT/CN2020/078751 dated Jul. 9, 2020.
Extended European Search Report for European Application No. 19 849 152.4 dated Mar. 16, 2021.
Zheng Weilin et al. "NutBaas: A Blockchain-as-a-Service Platform", IEEE Access, vol. 7, Sep. 17, 2019.
Minkyo In et al., "Draft new Recommendation ITU-T Y.BaaS-reqts: Cloud Computing—functional requirements for blockchain as a service; TDxxx/WP2", Oct. 21, 2019.
Search Report for European Application No. 20 725 745.2 dated Jun. 9, 2021.
Senthil Nathan et al., "Blockchain Meets Database: Design and Implementation of a Blockchain Relational Database", Mar. 5, 2019.
Search Report for European Application No. 20 725 754.4 dated Jun. 9, 2021.
Geoff Goodell et al., "A Decentralized Digital Identity Architecture", Frontiers in Blockchain, Nov. 5, 2019.

* cited by examiner

SYSTEM AND METHOD FOR BLOCKCHAIN-BASED DECENTRALIZED APPLICATION DEVELOPMENT

CROSS REFERENCE TO RELATED APPLICATION

The present application is a continuation application of International Patent Application No. PCT/CN2019/116649, filed on Nov. 8, 2019, and entitled "SYSTEM AND METHOD FOR BLOCKCHAIN-BASED DECENTRALIZED APPLICATION DEVELOPMENT", the entire contents of which are incorporated herein by reference.

TECHNICAL FIELD

This application generally relates to methods and devices for blockchain-based decentralized application development

BACKGROUND

The development of blockchain technology, such as blockchain-based virtual machines and smart contracts, has enabled the creation of decentralized applications based on blockchain technology. A decentralized application may comprise a frontend application and a backend blockchain-based logic. The frontend application may provide user interfaces, receive user inputs, and provide outputs to users. The backend blockchain-based logic may perform computation, processing, and data storage tasks related to the functionalities of the decentralized application.

Although blockchain systems may enjoy benefits such as security, credibility, and transparency as compared with conventional server or cloud-based systems, blockchain systems suffer from drawbacks such as inadequate computational efficiency and network capacity. These and other drawbacks arising from the characteristics of blockchain systems cause various barriers to the development and use of decentralized applications. For example, the low computational efficiency or high processing cost of some blockchain systems may drive certain developers of decentralized applications to implement at least part of the backend logic on a private server associated with the developer. This approach may frustrate the original purpose of a blockchain-based solution by compromising its security and credibility. As another example, limitations of the capacity of a blockchain system may delay the response time for queries by frontend applications for relevant data. The data structure of the blockchain may also limit the flexibility of using complex data queries. As another example, a developer may need to create a user identity management system based on a blockchain system for each decentralized application, which may be burdensome and costly. As another example, a blockchain system may not provide interfaces with external systems for storing data that may be relevant to the decentralized application. As another example, a development environment for developing, testing, compiling, and releasing the blockchain-based logic and the frontend application may not be available to the developer. Existing development environments may not allow integrating the development of the blockchain-based logic and the development of the frontend application. The interfacing between the two components may be complicated and difficult to program and test.

SUMMARY

Various embodiments of the specification include, but are not limited to, systems, methods, and non-transitory computer readable media for blockchain-based decentralized application development.

According to some embodiments, a computer-implemented method for blockchain-based decentralized application development comprises generating a blockchain contract and an interface specification associated with the blockchain contract based on a plurality of first inputs; deploying the blockchain contract on a blockchain; generating a client-side application based on a plurality of second inputs and the interface specification associated with the blockchain contract, wherein the client-side application is executable to invoke the blockchain contract deployed on the blockchain; and storing the client-side application in an online storage system.

In some embodiments, the method further comprises providing an integrated development environment (IDE) for blockchain-contract development and application development; receiving the plurality of first inputs in the IDE; and receiving the plurality of second inputs in the IDE.

In some embodiments, the generating a blockchain contract comprises obtaining source code associated with the blockchain contract based on the plurality of first inputs and compiling the obtained source code to generate bytecode associated with the blockchain contract.

In some embodiments, the generating a blockchain contract further comprises, prior to compiling the obtained source code to generate bytecode, analyzing the obtained source code to identify one or more grammar issues or analyzing the obtained source code to identify one or more security issues associated with the blockchain contract.

In some embodiments, the interface specification associated with the blockchain contract comprises a specification of an application binary interface (ABI) associated with the blockchain contract, wherein the specification of the ABI comprises a description of each of one or more interface functions associated with the blockchain contract.

In some embodiments, the generating a blockchain contract comprises generating one or more unit test cases associated with the blockchain contract based on a plurality of third inputs and executing the one or more unit test cases to test the blockchain contract.

In some embodiments, the generating a client-side application comprises generating an object associated with the blockchain contract based on the interface specification, wherein the object comprises one or more methods associated with the interface specification; obtaining the plurality of second inputs, wherein one or more of the second inputs comprises source code invoking the one or more methods associated with the interface specification; and including the object associated with the blockchain contract and the source code in the client-side application.

In some embodiments, the generating a client-side application comprises integrating a software development kit (SDK) associated with the blockchain in the client-side application.

In some embodiments, one or more of the second inputs comprise one or more references to one or more blockchain-based programs associated with the blockchain. The client-side application is executable to invoke the one or more blockchain-based programs.

In some embodiments, the generating a client-side application comprises integrating one or more SDKs associated with the one or more blockchain-based programs in the client-side application.

In some embodiments, the generating a client-side application comprises providing one or more simulators for testing the blockchain contract or the client-side application and executing the client-side application or the blockchain contract using the one or more simulators to identify one or more issues associated with the client-side application or the blockchain contract.

In some embodiments, the online storage system comprises a distributed file system according to the InterPlanetary File System (IPFS) protocol or a cloud-based storage system.

According to other embodiments, a system for blockchain-based decentralized application development comprises one or more processors and one or more computer-readable memories coupled to the one or more processors and having instructions stored thereon that are executable by the one or more processors to perform the method of any of the preceding embodiments.

According to yet other embodiments, a non-transitory computer-readable storage medium is configured with instructions executable by one or more processors to cause the one or more processors to perform the method of any of the preceding embodiments.

According to still other embodiments, an apparatus for blockchain-based decentralized application development comprises a plurality of modules for performing the method of any of the preceding embodiments.

According to some embodiments, a system for blockchain-based decentralized application development comprises one or more processors and one or more computer-readable memories coupled to the one or more processors and having instructions stored thereon that are executable by the one or more processors to perform operations comprising generating a blockchain contract and an interface specification associated with the blockchain contract based on a plurality of first inputs; deploying the blockchain contract on a blockchain; generating a client-side application based on a plurality of second inputs and the interface specification associated with the blockchain contract, wherein the client-side application is executable to invoke the blockchain contract deployed on the blockchain; and storing the client-side application in an online storage system.

According to other embodiments, a non-transitory computer-readable storage medium is configured with instructions executable by one or more processors to cause the one or more processors to perform operations comprising generating a blockchain contract and an interface specification associated with the blockchain contract based on a plurality of first inputs; deploying the blockchain contract on a blockchain; generating a client-side application based on a plurality of second inputs and the interface specification associated with the blockchain contract, wherein the client-side application is executable to invoke the blockchain contract deployed on the blockchain; and storing the client-side application in an online storage system.

According to yet other embodiments, an apparatus for blockchain-based decentralized application development comprises a first generating module for generating a blockchain contract and an interface specification associated with the blockchain contract based on a plurality of first inputs; a deploying module for deploying the blockchain contract on a blockchain; a second generating module for generating a client-side application based on a plurality of second inputs and the interface specification associated with the blockchain contract, wherein the client-side application is executable to invoke the blockchain contract deployed on the blockchain; and a storing module for storing the client-side application in an online storage system.

Embodiments disclosed herein have one or more technical effects. In some embodiments, an online platform provides various blockchain-based services to decentralized applications. This allows outsourcing of various functionalities of the decentralized applications and enables development of decentralized applications that are lightweight and simple to implement. In other embodiments, the platform provides trustworthy intermediate storage of blockchain data as well as complex query capabilities for the data. This allows effective acquisition of blockchain data by decentralized applications without overloading the data interfaces provided in association with the blockchain. In yet other embodiments, the platform hosts a marketplace of blockchain-based programs that may be invoked or otherwise used by decentralized applications. This expends the scope of potential capabilities of the decentralized applications and reduces the effort required for developing the decentralized applications. In still other embodiments, the platform provides an integrated development environment for developing, testing, and launching both the backend blockchain-based logic and the frontend application for a decentralized application. This enables quick development and launching of decentralized applications and effective creation and verification of the dependency relationships between different components of the decentralized applications. In other embodiments, the platform combines blockchain-based data storage and other security decentralized data storage solutions. This meets different data storage requirements posed by different parts of decentralized applications and enables flexible data management by such applications.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

DETAILED DESCRIPTION

Embodiments described herein provide methods, systems, and apparatus associated with a platform for the development, deployment, release, and operation of decentralized applications. The platform may support applications that use a decentralized structure to perform data storage, processing, and computation tasks and allows the applications to incorporate functionalities of other blockchain-based tools or programs. The platform may also provide resources and tools for efficient accessing of blockchain data as well as external data. The platform also makes available an integrated development environment for developing both the frontend application and the backend blockchain-based logic associated with a decentralized application. The development environment provides various tools for creating and testing the blockchain-based logic and the frontend application in isolation or aggregation. The platform expends the capabilities of blockchain-based decentralized applications, reduces the required complexity of client-side portions of such applications, and improves the effectiveness of their development and operation.

Figure 1:
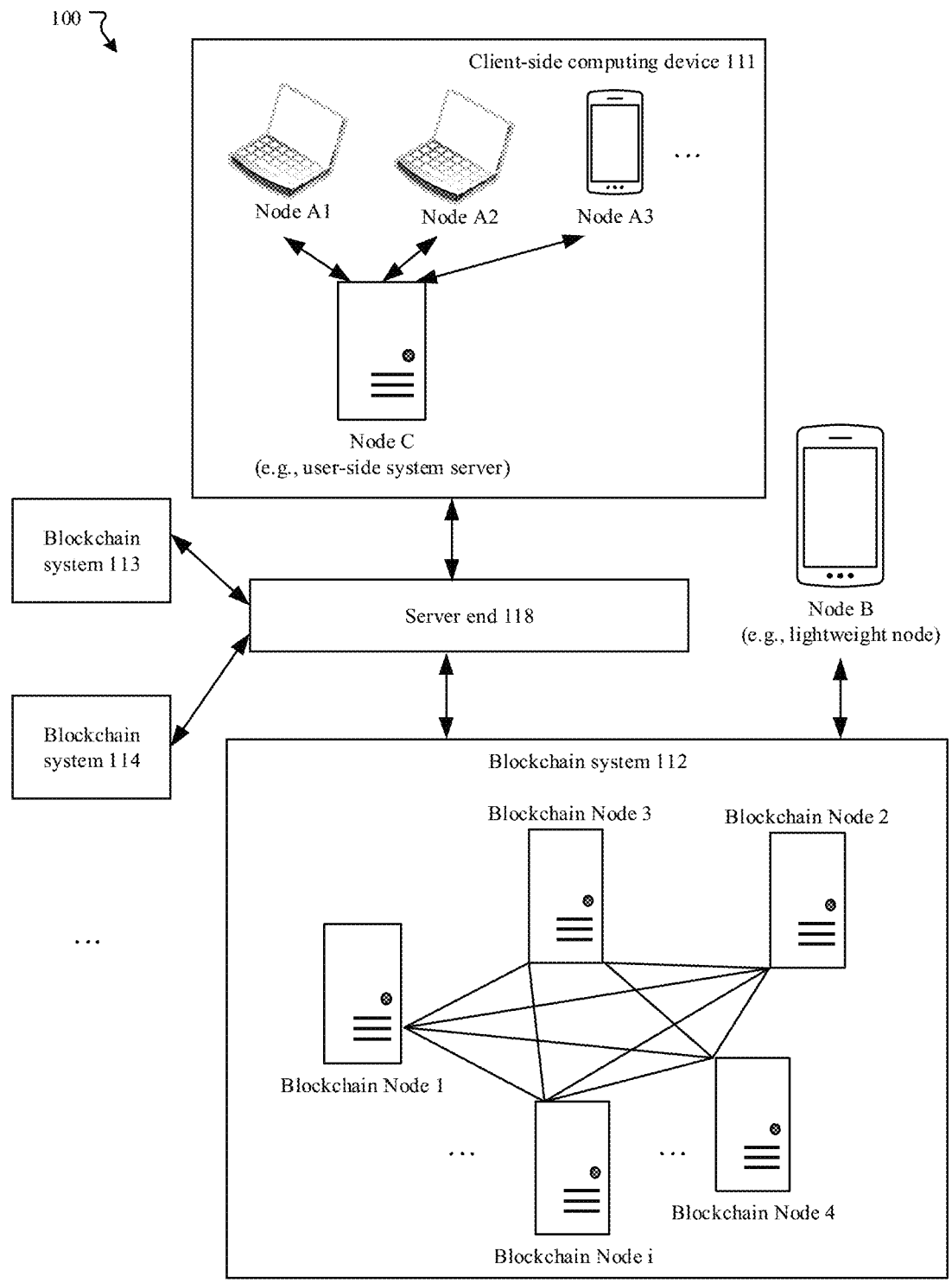
FIG. 1 illustrates a network environment associated with a blockchain in accordance with some embodiments.

FIG. 1 illustrates a network environment associated with a blockchain in accordance with some embodiments. As shown, in the environment 100, a client-side computing device 111 may couple to a server end 118, and the server end 118 and a Node B may couple to a blockchain system 112 through various communication networks. Similarly, the server end 118 may optionally couple to more blockchain systems similar to the blockchain system 112 such as blockchain system 113, blockchain system 114, etc. Each blockchain system may maintain one or more blockchains.

In some embodiments, the client-side computing device 111 may comprise one or more servers (e.g., Node C) and one or more other computing devices (e.g., Node A1, Node A2, Node A3). Node A1, Node A2, and Node A3 may couple to Node C. In some embodiments, Node C may be implemented by an entity (e.g., website, mobile phone Application, organization, company, enterprise), which has various local accounts (e.g., local accounts assessed from Node A1, Node A2, Node A3). For example, a mobile phone Application may have millions of end-users accessing the Application's server from respective user accounts. The Application's server may correspondingly store millions of user accounts. The components of the client-side computing device 111 and their arrangement may have many other configurations.

In some embodiments, the blockchain system 112 may comprise a plurality of blockchain nodes (e.g., Blockchain Node 1, Blockchain Node 2, Blockchain Node 3, Blockchain Node 4, Blockchain Node i, etc.) that maintain one or more blockchains (e.g., public blockchain, private blockchain, consortium blockchain, etc.). Other blockchain systems (e.g., blockchain system 113, etc.) may comprise a similar arrangement of blockchain nodes maintaining another blockchain. Each blockchain node may be found in one or more blockchain systems. The blockchain nodes may include full nodes. Full nodes may download every block and blockchain transaction and check them against the blockchain's consensus rules. The blockchain nodes may form a network with one blockchain node communicating with another. The order and the number of the blockchain nodes as shown are merely examples for illustration. The blockchain nodes may be implemented in servers, computers, etc. For example, each blockchain node may be implemented in a server or a cluster of servers. The cluster of servers may employ load balancing. Each blockchain node may correspond to one or more physical hardware devices or virtual devices coupled together via various types of communication methods such as TCP/IP. Depending on the classifications, the blockchain nodes may also be referred to as full nodes, Geth nodes, consensus nodes, etc.

In some embodiments, Node B may include a lightweight node. A lightweight node may not download the complete blockchain, but may instead just download the block headers to validate the authenticity of the blockchain transactions. Lightweight nodes may be served by and effectively dependent on full nodes (e.g., blockchain nodes in the blockchain system 112) to access more functions of the blockchain. The lightweight nodes may be implemented in electronic devices such as laptops, mobile phones, and the like by installing an appropriate software. In one embodiment, Node B may send a blockchain transaction to the blockchain system 112 for adding to the blockchain.

In some embodiments, there may be many more client-side computing devices coupled to the server end 118 similar to client-side computing device 111. The server end 118 may provide Blockchain-as-a-Service (BaaS) and be referred to as a BaaS cloud. In one embodiment, BaaS is a cloud service model in which clients or developers outsource behind-the-scenes aspects of a web or mobile application. BaaS may provide pre-written software for activities that take place on blockchains, such as user authentication, database management, and remote updating. The BaaS cloud may be implemented in a server, server cluster, or other devices. In one embodiment, the BaaS cloud provides an enterprise-level platform service based on blockchain technologies. This service may help clients to build a secure and stable blockchain environment as well as manage the deployment, operation, maintenance, and development of blockchain easily. The service features high security, high stability, ease-of-use, and openness and sharing. Based on the abundant security strategies and multi-tenant isolation of cloud, the BaaS cloud can provide advanced security protection using chip encryption technologies. Based on highly reliable data storage, this service provides end-to-end and highly available services that can scale up quickly without interruption. The BaaS cloud can provide enhanced administrative functions to help clients to build an enterprise-level blockchain network environment. The BaaS cloud can provide native support for standard blockchain applications and data, support mainstream open-source blockchain technologies like Hyperledger Fabric and Enterprise Ethereum—Quorum, to build an open and inclusive technology ecosystem.

In the environment 100, each of the systems, nodes, and devices may be installed with appropriate software (e.g., application program interface) and/or hardware (e.g., wires, wireless connections) to access other devices of the environment 100. In general, the systems, nodes, and devices may be able to communicate with one another through one or more wired or wireless networks (e.g., the Internet) through which data can be communicated. Each of the systems, nodes, and devices may include one or more processors and one or more memories coupled to the one or more processors. The memories may be non-transitory and computer-readable and configured with instructions executable by one or more processors to cause the one or more processors to perform operations described herein. The instructions may be stored in the memories or downloaded over a communications network without necessarily being stored in the memories. Although the systems, nodes, and devices are shown as separate components in this figure, it will be appreciated that these nodes and devices can be implemented as single devices or multiple devices coupled together. For example, Node B may be alternatively integrated into Blockchain Node 2.

The devices such as Node A1, Node A2, Node A3, Node B, and Node C may be installed with an appropriate blockchain software for initiating, forwarding, or accessing blockchain transactions. The term "blockchain transaction" may refer to a unit of task executed in a blockchain system and recorded in the blockchain upon verification. In some embodiments, the server end 118 may construct a blockchain contract based on information obtained from Node A1, A2, or A3. The server end 118 may add the blockchain contract in a blockchain transaction. After the server end 118 submits the blockchain transaction to the blockchain system, the blockchain nodes may verify the blockchain transaction for adding to the blockchain. If the blockchain transaction is added to the blockchain, the blockchain contract is deployed on the blockchain and initiated at a certain state. Through one or more additional blockchain transactions, the deployed blockchain contract may be invoked to update the certain state.

Blockchain transactions may be verified according to a consensus rule. For example, a POW (proof-of-work) consensus process is provided below. Notwithstanding, other types of consensus processes such as POS (proof-of-stake), DPOS (delegate-proof-of-stake), and PBFT (practical *Byzantine* Fault Tolerance) may be similarly applied to the disclosed systems and methods.

In some embodiments with respect to blockchain transaction verification, after receiving a blockchain transaction request of an unconfirmed blockchain transaction, a recipient blockchain node may perform some preliminary verification of the blockchain transaction. For example, Blockchain Node 1 may perform the preliminary verification after receiving a blockchain transaction from Node C. Once verified, the blockchain transaction may be stored in the database of the recipient blockchain node (e.g., Blockchain Node 1), which may also forward the blockchain transaction to one or more other blockchain nodes (e.g., Blockchain Node 3, Blockchain Node 4). Similarly, the each blockchain node may comprise or couple to a memory storing a database. The database may store a plurality of unconfirmed blockchain transactions. After receiving the blockchain transaction, the one or more other blockchain nodes may repeat the preliminary verification and broadcasting process done by the recipient blockchain node.

For verification, each blockchain node may select some of the blockchain transactions from the database according to its preference and form them into a proposed new block for the blockchain. The blockchain node may perform "mining" of the proposed new block by devoting computing power to solve complex mathematical problems. If the blockchain transaction involves a blockchain contract, the blockchain nodes may execute the blockchain contract locally in respective virtual machines (VMs). To handle the blockchain contracts, each blockchain node of the blockchain network runs a corresponding VM and executes the same instructions in the blockchain contract. A VM is a software emulation of a computer system based on computer architectures and provides functionality of a physical computer. VM in the blockchain context can be understood as a system designed to operate as a runtime environment for blockchain contracts.

A certain blockchain node that successfully mines the proposed new block of blockchain transactions in accordance with consensus rules may pack the new block into its local copy of the blockchain and multicast the results to other blockchain nodes. The certain blockchain node may be a blockchain node that has first successfully completed the verification, that has obtained a verification privilege, that has been chosen based on another consensus rule, etc. Then, the other blockchain nodes may follow the same order of execution performed by the certain blockchain node to locally execute the blockchain transactions in the new block, verify the execution results with one another (e.g., by performing hash calculations), and synchronize their copies of the blockchain with that of the certain blockchain node. By updating their local copies of the blockchain, the other blockchain nodes may similarly write such information in the blockchain transaction into respective local memories. As such, the blockchain contract can be deployed on the blockchain. If the verification fails at some point, the blockchain transaction is rejected.

The deployed blockchain contract may have an address, according to which the deployed contract can be accessed. A blockchain node may invoke the deployed blockchain contract by inputting certain parameters to the blockchain contract. In one embodiment, a deployed blockchain contract may be invoked to add or update certain information in the blockchain contract, thereby updating one or more states in the blockchain contract. In one embodiment, the one or more states of the blockchain contract may be retrieved from the blockchain by inquiring a corresponding blockchain transaction added to the blockchain. The most updated state may be reflected in the most recent relevant blockchain transaction. Notwithstanding the above, other types of blockchain systems and associated consensus rules may be applied to the disclosed devices and methods.

Figure 2:
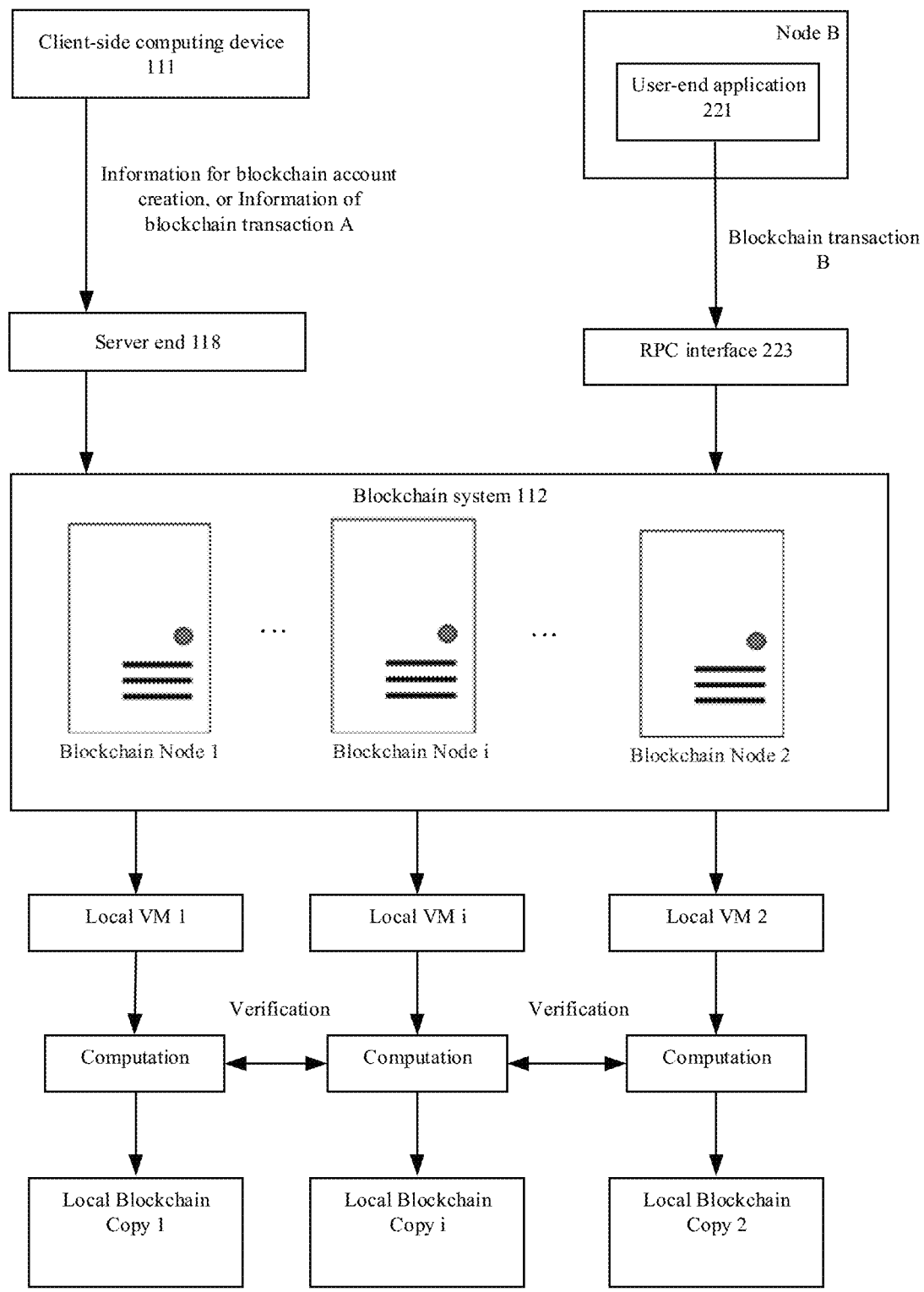
FIG. 2 illustrates a framework for implementing blockchain transactions in accordance with some embodiments.

FIG. 2 illustrates a framework for implementing blockchain transactions in accordance with some embodiments. In some embodiments, the client-side computing device 111 may transmit information to the server end 118. The information may be for creating a blockchain account, performing an action based on blockchain contract, etc. The blockchain may be maintained by the blockchain system 112. The server end 118 may construct a blockchain contract based on the information obtained from the client-side computing device 111. The server end 118 may add the blockchain contract in a blockchain transaction A. The server end 118 may sign the blockchain transaction on behalf of a user associated with the client-side computing device 111. For example, the blockchain transaction A may comprise information such as nonce (e.g., transaction serial number), from (e.g., a blockchain address of the user), to (e.g., empty if deploying a blockchain contract), transaction fee, signature (e.g., signature of the server end 118, signature of the user managed by the server end 118), value (e.g., transaction amount), data (e.g., the blockchain contract), etc. Then, the server end 118 may submit the blockchain transaction A to one or more blockchain nodes of the blockchain system 112 for adding to the blockchain.

After the blockchain transaction is added to the blockchain, the blockchain contract is deployed on the blockchain and initiated at a certain state. Through one or more additional blockchain transactions, the deployed blockchain contract may be invoked to update the certain state. In some embodiments, Node B may construct a signed blockchain transaction B and transmit it to the blockchain system 112 for execution. In one embodiment, the blockchain transaction B may be executed to invoke the deployed blockchain contract to update a state. In some embodiments, the blockchain transaction B may be programmed in source code at a user-end application 221. For example, a user or machine may program the blockchain transaction B. Node B may compile the source code using a corresponding compiler, which converts the source code into bytecode. The blockchain transaction B may comprise information such as nonce, from, to, transaction fee, value, signature, data, etc. Node B may send the blockchain transaction B to one or more blockchain nodes of the blockchain system 112 through a remote procedure call (RPC) interface 223 for execution. RPC is a protocol that a first program (e.g., user-end application) can use to request a service from a second program located in another computer on a network (e.g., blockchain node) without having to understand the network's details. When the first program causes a procedure to execute in a different address space, it is as if a normal (local) procedure call, without the programmer explicitly coding the details for the remote interaction.

In some embodiments, on receiving the blockchain transaction (e.g., blockchain transaction A or B), the recipient blockchain node may verify if the blockchain transaction is valid. For example, the signature and other formats may be verified. If the verification succeeds, the recipient blockchain node may broadcast the received blockchain transaction to the blockchain network including various other blockchain nodes. Some blockchain nodes may participate in the mining process of the blockchain transaction. The blockchain transaction may be chosen by a certain node for consensus verification to pack into a new block. If the blockchain transaction involves deploying a blockchain contract, the certain node may create a contract account for the blockchain contract in association with a contract account address. If the blockchain transaction involves invoking a deployed blockchain contract, the certain node may trigger its local VM to execute the received blockchain transaction, thereby invoking the deployed blockchain contract from its local copy of the blockchain and updating the states in the deployed blockchain contract. If the certain node succeeds in mining a new block, the certain node may broadcast the new block to other blockchain nodes.

Upon receiving the new block, the other blockchain nodes may perform verifications. If a consensus is reached that the new block is valid, the new block is respectively packed to the local copies of the blockchain maintained by the blockchain nodes. The blockchain nodes may similarly trigger their local VMs (e.g., local VM 1, local VM i, local VM 2) to execute the blockchain transactions in the new block, thus invoking local copies of the blockchain (e.g., local blockchain copy 1, local blockchain copy i, local blockchain copy 2) and making corresponding updates. The hardware machine of each blockchain node may have access to one or more virtual machines, which may be a part of or couple to the corresponding blockchain node. Each time, a corresponding local VM may be triggered to execute the blockchain transaction. Likewise, all other blockchain transactions in the new block will be executed. Lightweight nodes may also synchronize to the updated blockchain.

Figure 3:
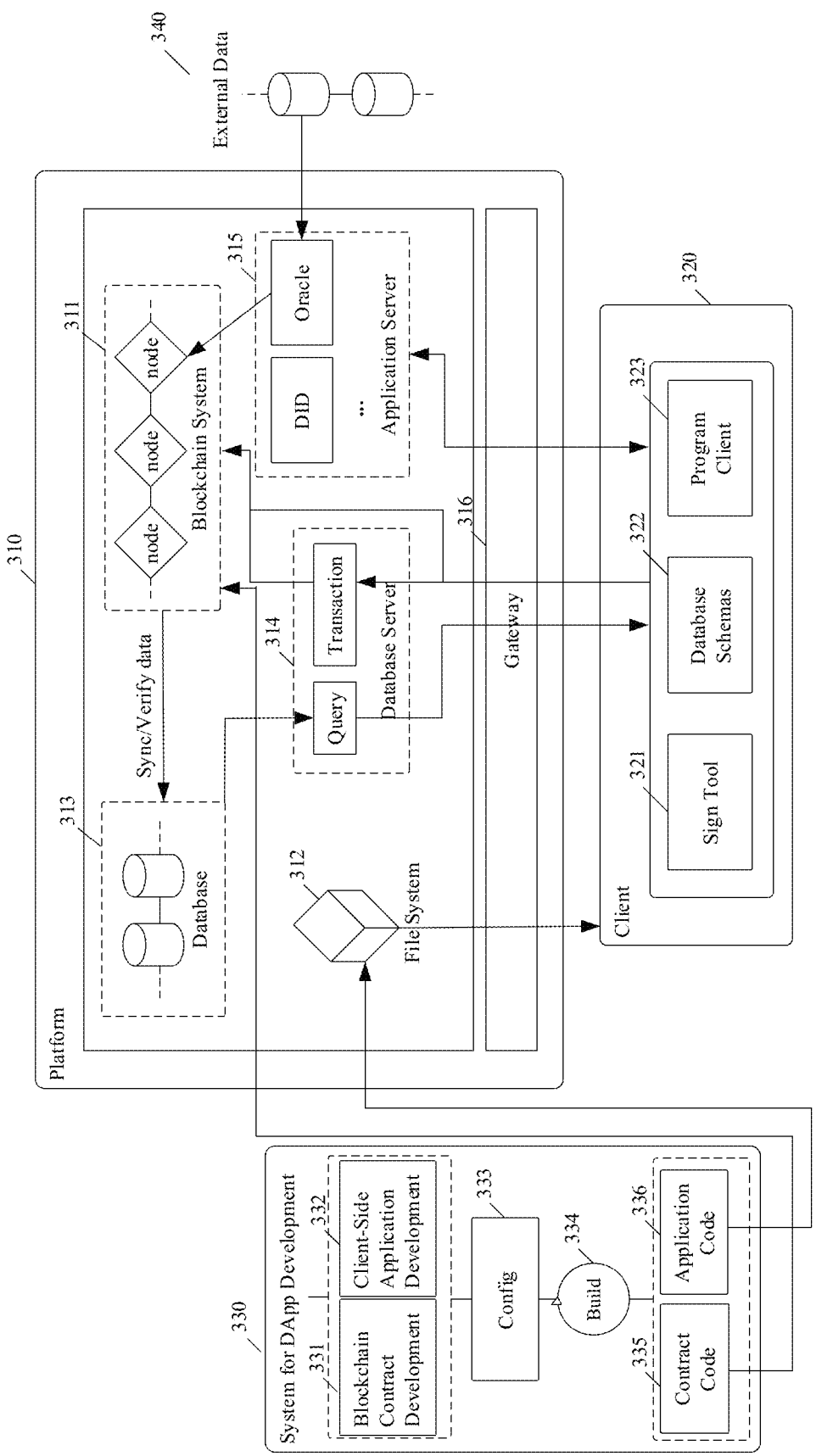
FIG. 3 illustrates a network environment for supporting blockchain-based decentralized applications in accordance with some embodiments.

FIG. 3 illustrates a network environment for supporting blockchain-based decentralized applications in accordance with some embodiments. In some embodiments, the network environment may comprise a platform 310 providing various services enabling decentralized applications, one or more client systems 320 each being associated with one or more users or other suitable entities, one or more computing systems 330 associated with a development environment for decentralized applications. In some embodiments, the client systems 320 may operate one or more client-side applications, one or more of which may be supported by backend processing of one or more blockchain contracts. In some embodiments, the one or more computing systems 330 that provides the development environment may be implemented as part of the platform 310, as one or more client-side computing devices, or as a combination of one or more client-side computing devices and one or more computing devices associated with the platform 310.

In some embodiments, the platform 310 may comprise a blockchain system 311 that comprises one or more blockchain nodes configured to manage a blockchain. In some embodiments, the blockchain system 311 may be implemented as part or the entirety of the server end 118 shown in FIGS. 1 and 2, part or the entirety of any of the blockchain systems 111, 112, 113, 114 shown in FIGS. 1 and 2, or any combination thereof. In some embodiments, the blockchain system 311 may comprise blockchain nodes associated with a plurality of blockchains and be configured to manage each of the plurality of blockchains. In some embodiments, the blockchain system 311 may receive one or more blockchain transactions from a client-side application running on the client system 320 and add the one or more blockchain transactions to an appropriate blockchain via one or more of the blockchain nodes. In other embodiments, the blockchain system 311 may generate one or more blockchain transactions based on requests from a client-side application running on the client system 320 and add the one or more blockchain transactions to an appropriate blockchain via one or more of the blockchain nodes.

In some embodiments, the platform 310 may comprise one or more computing devices 312 associated with a file system. The file system may be configured to store a plurality of resources associated with one or more client-side applications and to provide one or more of the plurality of resources to the one or more client-side applications based on requests from the one or more client-side applications. In some embodiments, one or more of the client-side applications may be associated with a blockchain or be supported by processing and computation on a blockchain. For example, one or more of the client-side applications may each be associated with one or more blockchain contracts on a blockchain. In some embodiments, the file system may comprise a distributed, peer-to-peer, or cloud-based file system. As an example, the file system may be implemented according to the InterPlanetary File System (IPFS) protocol. As another example, the file system may be implemented as a content delivery network (CDN). The file system may comprise a plurality of nodes each configured to communicate with one or more other nodes and to store data. The platform 310 may comprise one or more of the nodes associated with the file system. Data stored in the file system may be retrieved via one or more of the nodes. In other embodiments, the file system may comprise a cloud-based data-storage system.

In some embodiments, the platform 310 may comprise a database 313. The database 313 may store data from one or more blockchains associated with the blockchain system 311. In some embodiments, the database 313 may be configured to periodically synchronize data stored therein with data on a blockchain. In other embodiments, the database 313 may scan data on the blockchain or obtained from the blockchain to identify one or more issues, such as compliance issues with relevant rules or regulations. In some embodiments, the database 313 may be coupled to a database server 314. The database 313 may be configured to receive one or more data queries from the database server 314, obtain data responsive to the one or more data queries, and provide the data responsive to the one or more data queries to the database server 314. In some embodiments, the database 313 may be configured to process complex queries such as conditional queries, aggregate queries, or joined queries. In some embodiments, by synchronizing data on a blockchain to the database 313 and directly providing such data from the database 313, the platform 310 may reduce the number of queries for accessing the blockchain and the processing workload thereof as well as support advanced operations such as complex queries and data auditing.

In some embodiments, the platform 310 may comprise a database server 314. The database server 314 may be configured to query the database 313 to obtain data associated with one or more blockchains associated with the blockchain system 311. In some embodiments, the database server 314 may receive one or more data requests from a client-side application running on a client system 320 and query the database 313 based on the one or more data requests. In some embodiments, the client-side application may be associated with a blockchain contract on a blockchain managed by the blockchain system 311 and may request data associated with the blockchain contract. In response to the request, the database server 314 may query the database 313 to obtain data associated with the blockchain contract and send the obtained data to the client-side application. In some embodiments, one or more database schema associated with the database 313 may be publicized or otherwise made available to one or more client-side applications. The client-side applications may formulate its data requests to the database server 314 based on the database schemas.

In some embodiments, the database server 314 may be configured to perform blockchain transaction auditing. The database server 314 may obtain a blockchain transaction associated with a blockchain from a client-side application running on a client system 320. The database server may check the blockchain transaction to confirm that the blockchain transaction satisfies one or more pre-set requirements and send the blockchain transaction to the blockchain system 311 for adding to an appropriate blockchain. As also described above, the blockchain transaction auditing may or may not be necessary. If unnecessary, the client application may bypass the database server 314 and directly send the blockchain transaction to the blockchain system 311 for adding to the blockchain.

In some embodiments, the platform 310 may comprise an application server 315. The application server 315 may host one or more blockchain-based programs. Each of the blockchain-based programs may comprise, for example, logic supported by operation of a blockchain, logic implemented on one or more servers (e.g., one or more servers associated with the platform 310), and interfaces making the blockchain-based program accessible to other applications. In some embodiments, the application server 315 may be configured to execute a blockchain-based program based on one or more requests from a client-side application. The blockchain-based program may be associated with a blockchain contract on a blockchain associated with the blockchain system 311. In some embodiments, the client-side application sending the request may also be associated with a blockchain contract on the blockchain. The backend blockchain contracts associated with the blockchain-based program and the client-side application, respectively, may interact with each other. For example, the blockchain contract associated with the blockchain-based program may be executable to generate one or more inputs to the blockchain contract associated with the client-side application. In some embodiments, one or more blockchain-based programs hosted by the application server 315 may be provided by a provider of the platform 310. One or more other blockchain-based programs hosted by the application server 315 may be provided by one or more third-party blockchain service providers. Examples of blockchain-based programs may comprise a program providing a decentralized identity service and a program providing an oracle service.

As an example, a blockchain-based program may provide an oracle service or a service associated with incorporating data external to a blockchain into a blockchain. In some embodiments, the blockchain based program may obtain external data from trusted sources 340, authenticate the external data, and inject the external data into the blockchain. For example, the blockchain-based program may be executable to obtain external data from one or more external computing systems 340, generate a blockchain transaction comprising the obtained external data, and send the blockchain transaction comprising the obtained external data to the one or more blockchain nodes for adding to the blockchain. In some embodiments, the blockchain-based program may provide protection for the external data before such data is injected into the blockchain. For example, the blockchain-based program may use a trusted execution environment (TEE), which may provide an isolated execution environment offering security features such as isolated execution, integrity of applications executing with the TEE, along with confidentiality of their assets. In some embodiments, a client-side application may incorporate trusted data into its blockchain logic by invoking this blockchain-based program.

As another example, a blockchain-based program may provide identity service. The blockchain-based program may be operable to create decentralized identifiers (DID), create and manage DID documents, authenticate DIDs, provide identity information based on DIDs, or perform other suitable functionalities. The DIDs may be linked to and used for uniquely identifying accounts associated with users or other entities. In some embodiments, the blockchain-based program may be configured to receive one or more inputs from a client-side application. The one or more inputs may comprise one or more digital signatures associated with one or more users or entities. The digital signatures may have been generated based on signature tools integrated in or invoked by the client-side applications, which may be operable to safekeep user credentials, cryptographic key pairs, or other confidential information and to generate digital signatures or other proof of identity for users. For example, the blockchain-based program may be executable to obtain a decentralized identifier (DID) from the client-side application, generate a blockchain transaction for obtaining a DID document corresponding to the DID from the blockchain, and send the blockchain transaction for obtaining the DID document to the one or more blockchain nodes for adding to the blockchain. In some embodiments, a client-side application may be implemented without account management or password verification functionalities, while relying on this blockchain-based program to achieve such functionalities.

In some embodiments, the platform 310 may comprise a gateway 316. The gateway may be configured to provide to a client-side application running on the client system 320 one or more interfaces associated with the blockchain system 311, the one or more computing devices 312 associated with the file system, the database 313, the database server 314, the application server 315, other suitable components of the platform 310, or any combination thereof. The gateway 316 may be configured to perform various functionalities such as routing, address mapping, message forwarding, other suitable functionalities, or any combination thereof. For example, the gateway 316 may be configured to map and resolve routing of one or more resources associated with a client-side application to one or more addresses associated with the file system 312, revolve one or more addresses associated with a blockchain-based program running on the application server 315, search for routing information associated with the database 313 storing data from the blockchain, perform another suitable operation, or any combination thereof.

In some embodiments, a client system 320 may comprise one or more client-side applications and one or more tools supporting the client-side applications. One or more of the tools on a client system 320 may correspond to one or more components of the platform 310 and enable a client-side application to interact with or user one or more services provided by the platform 310. As an example, the client system 320 may comprise a signature tool 321, which may be configured to safekeep one or more cryptographic keys associated with one or more users and generate content or message based on the cryptographic keys, such as a digital signature associated with a user. Alternatively, the signature tool 321 may be provided as a cloud-based service and can be invoked by the client-side application. As another example, the client system 320 may store a set of database schemas 322 associated with the database 313. The client system 320 may generate one or more data requests or queries for data stored in the database 313 based on the database schemas 322. As yet another example, the client system 320 may comprise one or more program clients 323, each being associated with one of the blockchain-based programs hosted by the application server 315. A program client 323 may provide one or more interfaces to one or more functionalities of the corresponding blockchain-based application. A client-side application may interact with the program client 323 in order to use one or more functionalities of the corresponding blockchain-based program.

In some embodiments, the one or more computing systems 330 associated with a development environment for decentralized applications may comprise one or more software packages or modules for hosting and operating the application development environment. The development environment may comprise one or more interfaces 331 for composing and editing source code for blockchain contracts, one or more interfaces 332 for composing and editing source code for client-side applications associated with the blockchain contracts, one or more tools 333 for inserting configuration information (e.g., information associated with blockchain-based programs, dependency information between client-side applications and blockchain contracts) into the code corresponding to the client-side application or the blockchain contracts, one or more tools 334 for compiling and packing the source code into deployable and machine-executable code, one or more tools 335 for deploying executable code associated with blockchain contracts, one or more tools 336 for deploying executable code associated with client-side applications, one or more other suitable components, or any combination thereof. In some embodiments, the one or more computing devices may be configured to operate an integrated development environment (IDE) for developing both a client-side application and a corresponding blockchain contract.

Figure 4:
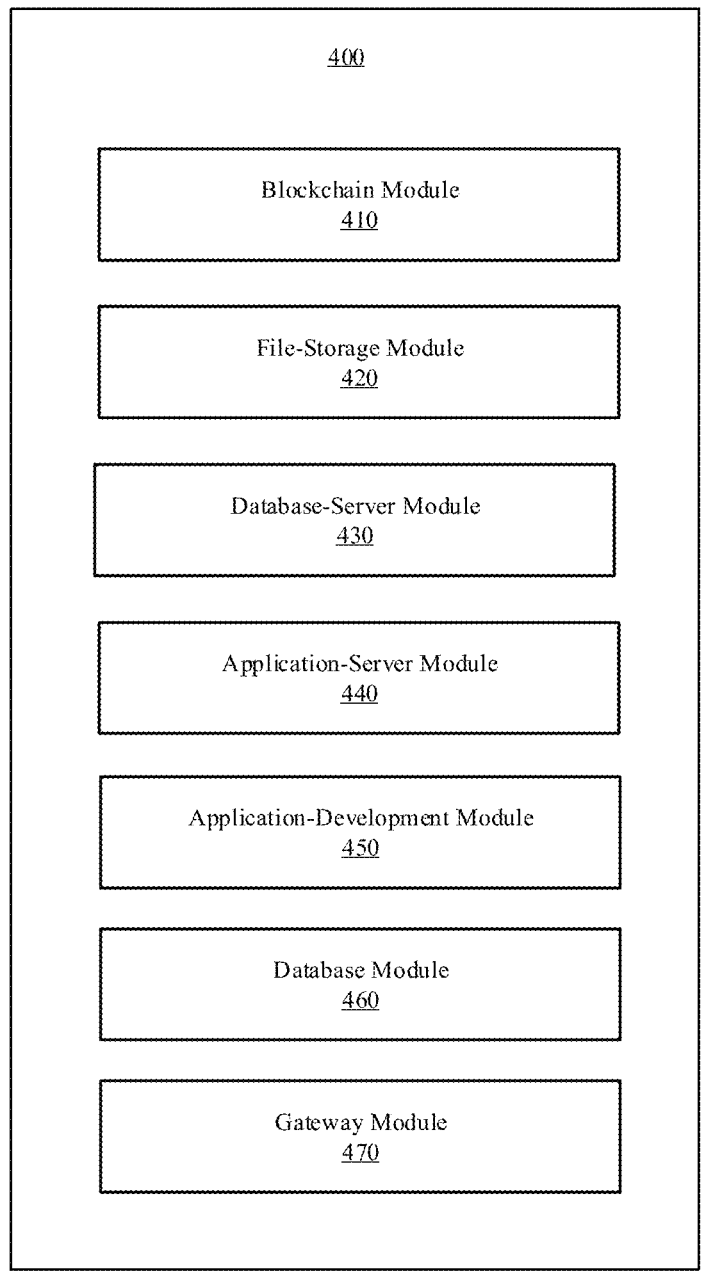
FIG. 4 illustrates a block diagram of an apparatus for supporting blockchain-based decentralized applications in accordance with some embodiments.

FIG. 4 illustrates a block diagram of an apparatus for supporting blockchain-based decentralized applications in accordance with some embodiments. The apparatus 400 may be an example of an implementation of one or more components of the network environment illustrated in FIG. 3. The apparatus 400 may comprise a blockchain module 410 configured to manage a blockchain. The apparatus 400 may comprise a file-storage module 420 associated with a file system that is configured to store a plurality of resources associated with a client-side application and to provide one or more of the plurality of resources to the client-side application, wherein the client-side application is associated with a first blockchain contract on the blockchain; In some embodiments, the file system comprises a distributed file system according to the InterPlanetary File System (IPFS) protocol.

The apparatus 400 may comprise a database-server module 430 configured to query a database module 460 storing data from the blockchain to obtain data associated with the first blockchain contract and to send the obtained data to the client-side application. In some embodiments, the database-server module 430 is further configured to obtain a blockchain transaction associated with the blockchain from the client-side application, check the blockchain transaction to confirm that the blockchain transaction satisfies one or more pre-set requirements, and send the blockchain transaction to the blockchain module 410 for adding to the blockchain.

The apparatus 400 may comprise an application-server module 440 configured to execute a blockchain-based program based on one or more requests from the client-side application, wherein the blockchain-based program is associated with a second blockchain contract on the blockchain, and wherein the second blockchain contract is executable to generate one or more inputs to the first blockchain contract. In some embodiments, the blockchain-based program is executable to obtain external data from one or more external computing systems, generate a blockchain transaction comprising the obtained external data, and send the blockchain transaction comprising the obtained external data to the blockchain module 410 for adding to the blockchain. In some embodiments, the blockchain-based program is executable to obtain a decentralized identifier (DID) from the client-side application, generate a blockchain transaction for obtaining a DID document corresponding to the DID from the blockchain, and send the blockchain transaction for obtaining the DID document to the blockchain module 410 for adding to the blockchain.

The apparatus 400 may comprise an application-development module 450 configured to operate an integrated development environment (IDE) for developing the client-side application and the first blockchain contract.

The apparatus 400 may comprise the database module 460, wherein the database module 460 is configured to receive one or more data queries from the database-server module 430, obtain data responsive to the one or more data queries, and provide the data responsive to the one or more data queries to the database-server module 430. In some embodiments, the database module 460 is further configured to periodically synchronize the database module 460 with data on the blockchain or to scan the data on the blockchain to identify one or more compliance issues.

The apparatus 400 may comprise a gateway module 470 configured to provide, to the client-side application, one or more interfaces associated with the blockchain module 410, the file-storage module 420, the database-server module 430, or the application-server module 440. In some embodiments, the gateway module 470 is configured to map each of the plurality of resources associated with the client-side application to one or more addresses associated with the file system, to revolve one or more addresses associated with the blockchain-based program, or to search for routing information associated with the database module 460.

Figure 5:
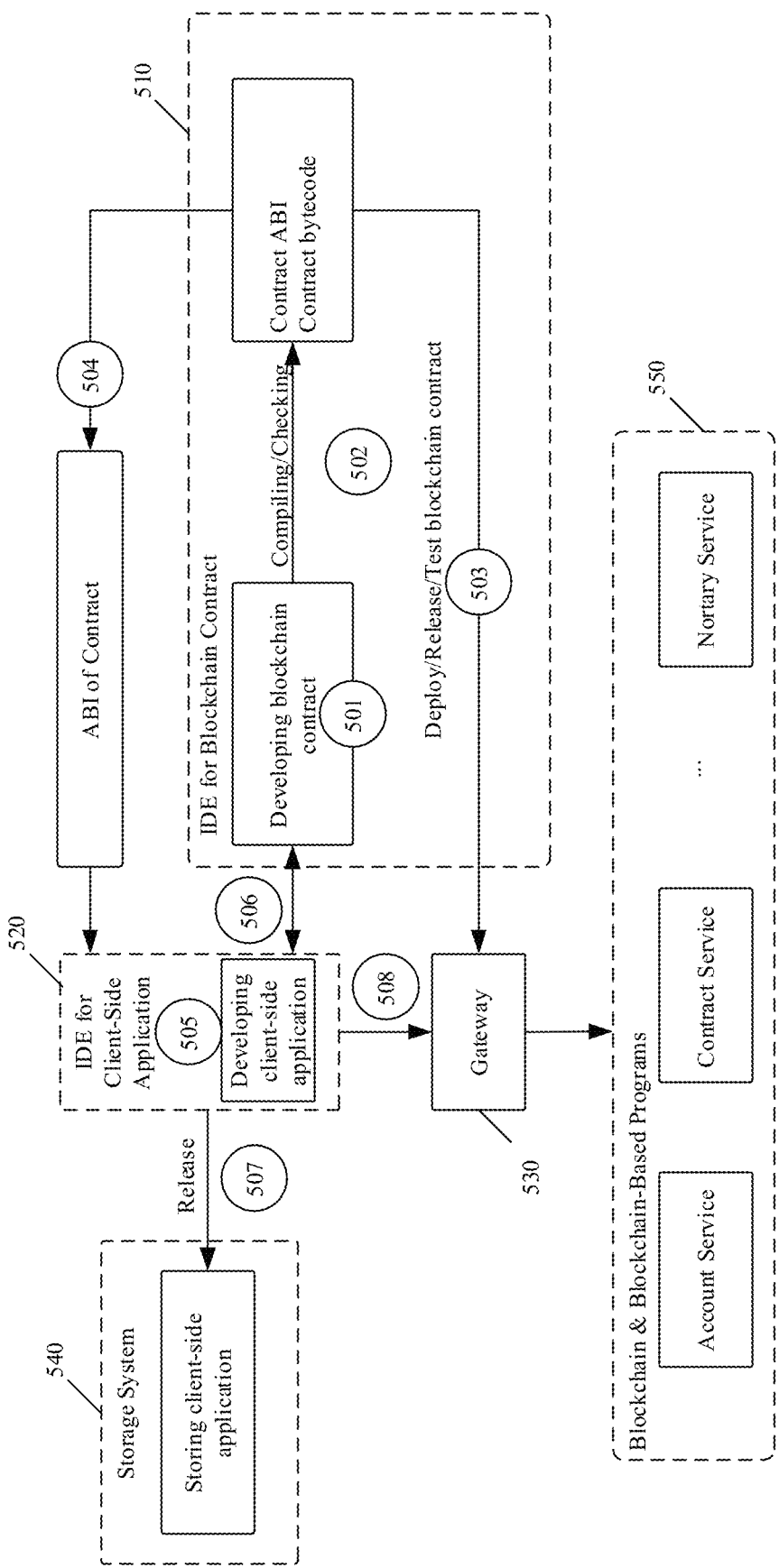
FIG. 5 illustrates a process for blockchain-based decentralized application development in accordance with some embodiments.

FIG. 5 illustrates a process for blockchain-based decentralized application development in accordance with some embodiments. Depending on the implementation, the process shown in FIG. 5 may include additional, fewer, or alternative steps performed in various orders or in parallel. A decentralized application may comprise a client-side application and one or more blockchain contracts associated with the client-side application. The client-side application may provide an interface in which user inputs are received and outputs are displayed. The client-side application may relay backend computation and processing to a blockchain in which the one or more blockchain contracts is stored. In particular, the logic associated with the one or more blockchain contracts may be executed by one or more virtual machines associated with the blockchain.

In some embodiments, an IDE may be provided and may enable the development of both the blockchain contract and the client-side application associated with a decentralized application in the same environment. As illustrated in FIG. 5, the IDE may comprise a development environment 510 for blockchain contracts and/or a development environment 520 for client-side applications. Such an IDE may be implemented on one or more of the computing systems 330 illustrated in FIG. 3. The development environments 510 and 520 may interface with one or more storage systems 540 and one or more systems 550 associated with one or more blockchains via a gateway 530. The one or more systems 550 associated with one or more blockchains may host and operate a plurality of services such as account service, contract service, notary service, other suitable services, or any combination thereof. Here, the gateway 530 may be implemented similarly to the gateway 316 as shown in FIG. 3. The one or more storage systems 540 may be implemented similarly to the file system associated with the one or more computing devices 312 as shown in FIG. 3. The one or more systems 550 associated with one or more blockchains may be implemented as the blockchain system 311, the application server 315, or a combination of the blockchain system 311 and the application server 315 as shown in FIG. 3.

In some embodiments, the process for blockchain-based decentralized application development may start at step 501. The IDE (e.g., 510) may generate a blockchain contract and an interface specification associated with the blockchain contract based on a plurality of inputs. In one embodiment, the plurality of first inputs may be entered by a developer of the decentralized application in a user interface provided by the IDE. The inputs may comprise source code associated with the blockchain contract. The source code may be written in one or more programming languages of the developer's choice (e.g., Solidity, C++). In some embodiments, the IDE may provide various tools to assist a developer in creating a new blockchain contract. The tools may comprise, for example, a marketplace for blockchain contract templates, a database of verified or validated blockchain contracts, translation or transformation of blockchain contracts created in different language or for different blockchain platforms, other suitable tools, or any combination thereof.

In some embodiments, at step 502, the IDE (e.g., 510) may obtain the source code associated with the blockchain contract based on the inputs and compile the obtained source code to generate bytecode associated with the blockchain contract. Before compiling the source code, the IDE may perform checks on the source code. For example, the IDE may analyze the obtained source code to identify one or more grammar issues or analyze the obtained source code to identify one or more security issues associated with the blockchain contract.

In some embodiments, the IDE (e.g., 510) may further generate an interface specification associated with the blockchain contract. The interface specification may comprise a specification of an application binary interface (ABI) associated with the blockchain contract. The specification of the ABI may comprise a description of each of one or more interface functions associated with the blockchain contract.

At step 503, the IDE (e.g., 510) may deploy the blockchain contract on a blockchain. In some embodiments, the IDE may generate one or more blockchain transactions comprising the logic of the blockchain contract, where the one or more blockchain transactions are executable to add the blockchain contract to the blockchain. The IDE may send the blockchain transactions to the computer system 550 associated with the blockchain via the gateway 530. The computer system 550 may comprise one or more blockchain nodes associated with the blockchain. The one or more blockchain nodes may add blockchain transactions to the blockchain such that the blockchain contract is registered on the blockchain. In some embodiments, the IDE may send the bytecode associated with the blockchain contract to the computer system 550 associated with the blockchain. The bytecode may be processed by a contract service associated with the computer system 550, which may add the bytecode associated with the blockchain contract to the blockchain.

In some embodiments, the IDE (e.g., 510) may also provide tools for testing the blockchain contract. For example, prior to deploying the blockchain contract on the blockchain, the IDE may generate one or more unit test cases associated with the blockchain contract and execute the one or more unit test cases to test the blockchain contract. The unit test cases may be generated automatically or based on a plurality of inputs. The IDE may use one or more other suitable methods to test the blockchain contract.

At step 504, the development environment 510 may provide the interface specification associated with the blockchain contract to the development environment 520 for client-side applications. In some embodiments, the development environment 520 may load the interface specification associated with the blockchain contract. In some embodiments, the IDE may generate an object associated with the blockchain contract based on the interface specification. The object may be generated in an object-based programming language in which the client-side application is to be programmed (e.g., JavaScript). The object may comprise one or more methods associated with the interface specification of the blockchain contract. The one or more methods may be called to interact with the blockchain contract. The IDE may incorporate code associated with the object in the source code associated with the client-side application. The step 504 may or may not occur concurrently with step 503.

At step 505, the IDE (e.g., 520) may generate a client-side application based on a plurality of inputs and the interface specification associated with the blockchain contract. The client-side application may be executable to invoke the blockchain contract deployed on the blockchain. In some embodiments, the source code for the client-side application may comprise the object associated with the blockchain contract. One or more of the inputs for creating the client-side application may invoke one or more of the methods associated with the interface specification to establish the dependency relationship between the client-side application and the blockchain contract and to enable the client-side application and an interface associated with the blockchain contract to invoke each other. The IDE may include in the client-side application the object associated with the blockchain contract and the source code based on the inputs.

In some embodiments, in order to interface with the blockchain contract deployed on the blockchain, the client-side application may require a software development kit associated with the blockchain. The IDE (e.g., 520) may integrate an SDK associated with the blockchain in the client-side application. In some embodiments, the client-side application may invoke one or more blockchain-based programs operating in the computer system 550 or the application server 315. One or more of the inputs for creating the client-side application may comprise one or more references to one or more blockchain-based programs associated with the blockchain. The client-side application may be executable to invoke the one or more blockchain-based programs. The IDE may integrate one or more SDKs associated with the one or more blockchain-based programs in the client-side application.

In some embodiments, the IDE (e.g., 510, 520) may provide one or more tools for testing the decentralized application that comprises the client-side application and the blockchain contract. In some embodiments, the IDE may provide one or more simulators for client-side applications and one or more simulators for blockchain contracts. The simulators may be used to simulate the execution of the decentralized application and to test the functioning of the decentralized application, such as the mutual invocation between the client-side application and the blockchain contract. In some embodiments, the IDE may provide one or more simulators for testing the blockchain contract or the client-side application and execute the client-side application or the blockchain contract using the one or more simulators to identify one or more issues associated with the client-side application or the blockchain contract. After appropriate testing, the IDE may prepare the client-side application for deployment.

In some embodiments, at step 507, the IDE (e.g., 520) may store the client-side application in an online storage system 540. The IDE may compile and pack the client-side application. Then, the IDE may send the client-side application to one or more systems for storage and release. For example, the client-side application may be stored and released on a distributed file system according to the InterPlanetary File System (IPFS) protocol or a cloud-based storage system. The client-side application may be made available for download by users from the online storage system 540. In some embodiments, the client-side application may be listed in a decentralized application marketplace for access by users.

In some embodiments, if the blockchain contract was updated during its integration with the client-side application or during testing, the IDE may deploy the blockchain contract to the blockchain via the gateway 530 at step 508. Step 508 may occur concurrently with step 507 in some embodiments.

Figure 6:
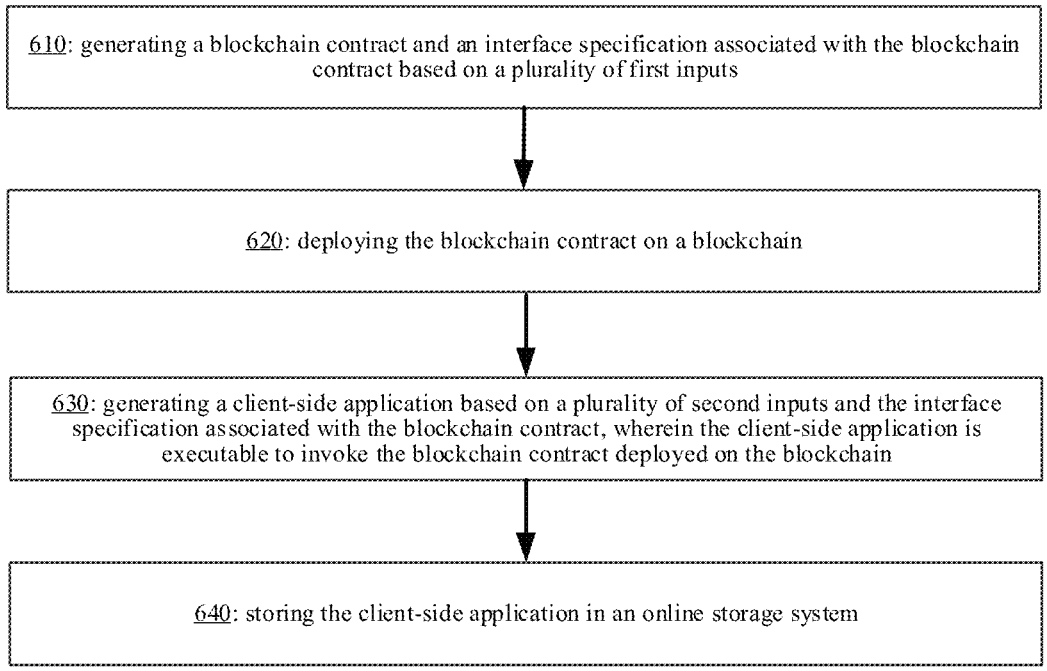
FIG. 6 illustrates a method for blockchain-based decentralized application development in accordance with some embodiments.

FIG. 6 illustrates a method for blockchain-based decentralized application development in accordance with some embodiments. The method 600 may be performed by a device, apparatus, or system for blockchain-based decentralized application development. The method 600 may be performed by one or more components of the environment or system illustrated by FIGS. 1-3 and 5, such as one or more components of the computer system 330 for decentralized application development in FIG. 3 or one or more components of the IDE 510 and 520 in FIG. 5. Depending on the implementation, the method 600 may include additional, fewer, or alternative steps performed in various orders or in parallel.

Block 610 includes generating a blockchain contract and an interface specification associated with the blockchain contract based on a plurality of first inputs. In some embodiments, the generating a blockchain contract comprises obtaining source code associated with the blockchain contract based on the plurality of first inputs and compiling the obtained source code to generate bytecode associated with the blockchain contract. In some embodiments, the interface specification associated with the blockchain contract comprises a specification of an application binary interface (ABI) associated with the blockchain contract, wherein the specification of the ABI comprises a description of each of one or more interface functions associated with the blockchain contract.

In some embodiments, the generating a blockchain contract further comprises, prior to compiling the obtained source code to generate bytecode, analyzing the obtained source code to identify one or more grammar issues or analyzing the obtained source code to identify one or more security issues associated with the blockchain contract. In some embodiments, the generating a blockchain contract comprises generating one or more unit test cases associated with the blockchain contract based on a plurality of third inputs and executing the one or more unit test cases to test the blockchain contract.

Block 620 includes deploying the blockchain contract on a blockchain.

Block 630 includes generating a client-side application based on a plurality of second inputs and the interface specification associated with the blockchain contract, wherein the client-side application is executable to invoke the blockchain contract deployed on the blockchain. In some embodiments, the generating a client-side application comprises integrating a software development kit (SDK) associated with the blockchain in the client-side application. In some embodiments, one or more of the second inputs comprise one or more references to one or more blockchain-based programs associated with the blockchain. The client-side application is executable to invoke the one or more blockchain-based programs. In some embodiments, the generating a client-side application comprises integrating one or more SDKs associated with the one or more blockchain-based programs in the client-side application.

In some embodiments, the generating a client-side application comprises generating an object associated with the blockchain contract based on the interface specification, wherein the object comprises one or more methods associated with the interface specification; obtaining the plurality of second inputs, wherein one or more of the second inputs comprises source code invoking the one or more methods associated with the interface specification; and including the object associated with the blockchain contract and the source code in the client-side application. In some embodiments, the generating a client-side application comprises providing one or more simulators for testing the blockchain contract or the client-side application and executing the client-side application or the blockchain contract using the one or more simulators to identify one or more issues associated with the client-side application or the blockchain contract.

Block 640 includes storing the client-side application in an online storage system. In some embodiments, the online storage system comprises a distributed file system according to the InterPlanetary File System (IPFS) protocol or a cloud-based storage system.

In some embodiments, the method further comprises providing an integrated development environment (IDE) for blockchain-contract development and application development; receiving the plurality of first inputs in the IDE; and receiving the plurality of second inputs in the IDE.

Figure 7:
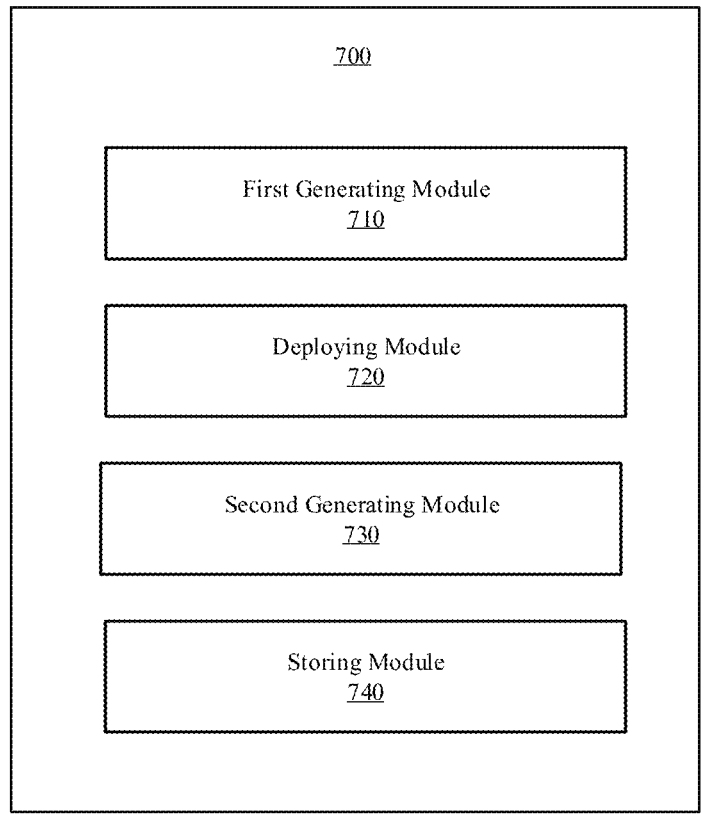
FIG. 7 illustrates a block diagram of a computer system for blockchain-based decentralized application development in accordance with some embodiments.

FIG. 7 illustrates a block diagram of a computer system for blockchain-based decentralized application development in accordance with some embodiments. The system 700 may be an example of an implementation of one or more components of the computer system 330 for decentralized application development in FIG. 3, one or more components of the IDE 510 and 520 in FIG. 5, or one or more other components illustrated in FIGS. 1-3 and 5. The method 600 may be implemented by the computer system 700. The computer system 700 may comprise one or more processors and one or more non-transitory computer-readable storage media (e.g., one or more memories) coupled to the one or more processors and configured with instructions executable by the one or more processors to cause the system or device (e.g., the processor) to perform the above-described method, e.g., the method 600. The computer system 700 may comprise various units/modules corresponding to the instructions (e.g., software instructions). In some embodiments, the computer system 700 may be referred to as an apparatus for blockchain-based decentralized application development. The apparatus may comprise a first generating module 710 for generating a blockchain contract and an interface specification associated with the blockchain contract based on a plurality of first inputs; a deploying module 720 for deploying the blockchain contract on a blockchain; a second generating module 730 for generating a client-side application based on a plurality of second inputs and the interface specification associated with the blockchain contract, wherein the client-side application is executable to invoke the blockchain contract deployed on the blockchain; and a storing module 740 for storing the client-side application in an online storage system.

The techniques described herein may be implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) may be generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof.

Figure 8:
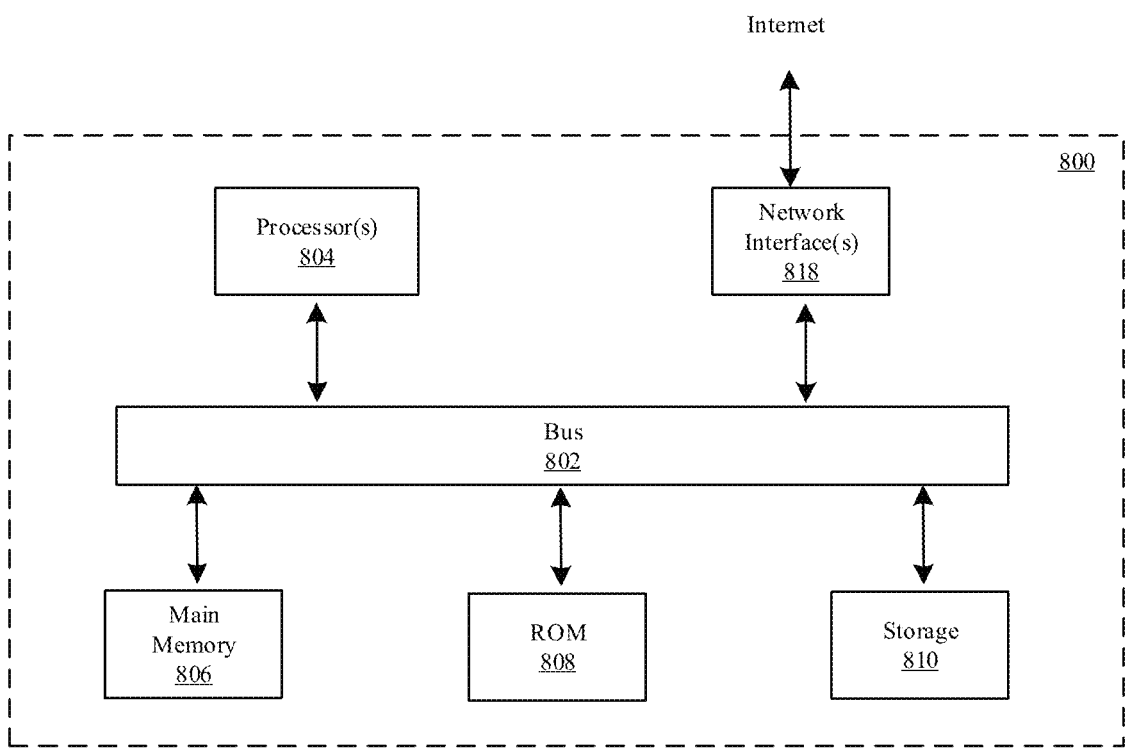
FIG. 8 illustrates a block diagram of a computer system in which any of the embodiments described herein may be implemented.

FIG. 8 illustrates a block diagram of a computer system in which any of the embodiments described herein may be implemented. The system 800 may be implemented in any of the components of the environments or systems illustrated in FIGS. 1-7. The software applications or services illustrated in FIGS. 1-7 may be implemented and operated on the system 800. One or more of the example methods illustrated by FIGS. 1-7 may be performed by one or more implementations of the computer system 800.

The computer system 800 may include a bus 802 or other communication mechanism for communicating information, one or more hardware processor(s) 804 coupled with bus 802 for processing information. Hardware processor(s) 804 may be, for example, one or more general purpose microprocessors.

The computer system 800 may also include a main memory 806, such as a random access memory (RAM), cache and/or other dynamic storage devices, coupled to bus 802 for storing information and instructions executable by processor(s) 804. Main memory 806 also may be used for storing temporary variables or other intermediate information during execution of instructions executable by processor(s) 804. Such instructions, when stored in storage media accessible to processor(s) 804, render computer system 800 into a special-purpose machine that is customized to perform the operations specified in the instructions. The computer system 800 may further include a read only memory (ROM) 808 or other static storage device coupled to bus 802 for storing static information and instructions for processor(s) 804. A storage device 810, such as a magnetic disk, optical disk, or USB thumb drive (Flash drive), etc., may be provided and coupled to bus 802 for storing information and instructions.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the operations, methods, and processes described herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 may cause processor(s) 804 to perform the process steps described herein. In alternative embodiments, hard-wired circuitry may be used in place of or in combination with software instructions.

The main memory 806, the ROM 808, and/or the storage device 810 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 800 may include a network interface 818 coupled to bus 802. Network interface 818 may provide a two-way data communication coupling to one or more network links that are connected to one or more local networks. For example, network interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 may send and receive electrical, electromagnetic or optical signals that carry digital data streams representing various types of information.

The computer system 800 can send messages and receive data, including program code, through the network(s), network link and network interface 818. In the Internet example, a server might transmit a requested code for an application program through the Internet, the ISP, the local network and the network interface 818.

The received code may be executed by processor(s) 804 as it is received, and/or stored in storage device 810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner. Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific embodiments, various modifications and changes may be made to these embodiments without departing from the broader scope of embodiments of the specification. The Detailed Description should not to be taken in a limiting sense, and the scope of various embodiments is defined only by the appended claims, along with the full range of equivalents to which such claims are entitled. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned. In addition, herein, "or" is inclusive and not exclusive, unless expressly indicated otherwise or indicated otherwise by context. Therefore, herein, "A, B, or C" means "A, B, C, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The invention claimed is:
1. A computer-implemented method for blockchain-based decentralized application development, comprising:
    generating a blockchain contract and an interface specification associated with the blockchain contract based on a plurality of first inputs;
    deploying the blockchain contract on a blockchain;
    generating a client-side application based on a plurality of second inputs and the interface specification associated with the blockchain contract, wherein the client-side application is executable to invoke the blockchain contract deployed on the blockchain and the generating the client-side application comprises:
  generating an object associated with the blockchain contract based on the interface specification, wherein the object comprises one or more methods associated with the interface specification;
  obtaining the plurality of second inputs, wherein one or more of the second inputs comprises source code invoking the one or more methods associated with the interface specification; and
  including the object associated with the blockchain contract and the source code in the client-side application; and
storing the client-side application in an online storage system.

2. The method of claim 1, further comprising:
providing an integrated development environment (IDE) for blockchain-contract development and application development;
receiving the plurality of first inputs in the IDE; and
receiving the plurality of second inputs in the IDE.

3. The method of claim 1, wherein the generating a blockchain contract comprises:
  obtaining source code associated with the blockchain contract based on the plurality of first inputs; and
  compiling the obtained source code to generate bytecode associated with the blockchain contract.

4. The method of claim 3, wherein the generating a blockchain contract further comprises, prior to compiling the obtained source code to generate bytecode:
  analyzing the obtained source code to identify one or more grammar issues; or
  analyzing the obtained source code to identify one or more security issues associated with the blockchain contract.

5. The method of claim 1, wherein the interface specification associated with the blockchain contract comprises:
  a specification of an application binary interface (ABI) associated with the blockchain contract, wherein the specification of the ABI comprises a description of each of one or more interface functions associated with the blockchain contract.

6. The method of claim 1, wherein the generating a blockchain contract comprises:
  generating one or more unit test cases associated with the blockchain contract based on a plurality of third inputs; and
  executing the one or more unit test cases to test the blockchain contract.

7. The method of claim 1, wherein the generating a client-side application comprises:
  integrating a software development kit (SDK) associated with the blockchain in the client-side application.

8. The method of claim 1, wherein:
  one or more of the second inputs comprise one or more references to one or more blockchain-based programs associated with the blockchain; and
  the client-side application is executable to invoke the one or more blockchain-based programs.

9. The method of claim 8, wherein the generating a client-side application comprises:
  integrating one or more SDKs associated with the one or more blockchain-based programs in the client-side application.

10. The method of claim 1, wherein the generating a client-side application comprises:
  providing one or more simulators for testing the blockchain contract or the client-side application; and
  executing the client-side application or the blockchain contract using the one or more simulators to identify one or more issues associated with the client-side application or the blockchain contract.

11. The method of claim 1, wherein the online storage system comprises:
  a distributed file system according to the InterPlanetary File System (IPFS) protocol; or
  a cloud-based storage system.

12. A non-transitory computer-readable storage medium for blockchain-based decentralized application development, configured with instructions executable by one or more processors to cause the one or more processors to perform operations comprising:
  generating a blockchain contract and an interface specification associated with the blockchain contract based on a plurality of first inputs;
  deploying the blockchain contract on a blockchain;
  generating a client-side application based on a plurality of second inputs and the interface specification associated with the blockchain contract, wherein the client-side application is executable to invoke the blockchain contract deployed on the blockchain and the generating the client-side application comprises:
    generating an object associated with the blockchain contract based on the interface specification, wherein the object comprises one or more methods associated with the interface specification;
    obtaining the plurality of second inputs, wherein one or more of the second inputs comprises source code invoking the one or more methods associated with the interface specification; and
    including the object associated with the blockchain contract and the source code in the client-side application; and
  storing the client-side application in an online storage system.

13. The medium of claim 12, wherein the operations further comprise:
  providing an integrated development environment (IDE) for blockchain-contract development and application development;
  receiving the plurality of first inputs in the IDE; and
  receiving the plurality of second inputs in the IDE.

14. The medium of claim 12, wherein the generating a blockchain contract comprises:
  obtaining source code associated with the blockchain contract based on the plurality of first inputs; and
  compiling the obtained source code to generate bytecode associated with the blockchain contract.

15. The medium of claim 14, wherein the generating a blockchain contract further comprises, prior to compiling the obtained source code to generate bytecode:
  analyzing the obtained source code to identify one or more grammar issues; or
  analyzing the obtained source code to identify one or more security issues associated with the blockchain contract.

16. The medium of claim 12, wherein the interface specification associated with the blockchain contract comprises:
  a specification of an application binary interface (ABI) associated with the blockchain contract, wherein the specification of the ABI comprises a description of each of one or more interface functions associated with the blockchain contract.

17. The medium of claim 12, wherein the generating a blockchain contract comprises:
   generating one or more unit test cases associated with the blockchain contract based on a plurality of third inputs; and
   executing the one or more unit test cases to test the blockchain contract.

18. A system for blockchain-based decentralized application development, comprising a processor and a non-transitory computer-readable storage medium storing instructions executable by the processor to cause the system to:
   generate a blockchain contract and an interface specification associated with the blockchain contract based on a plurality of first inputs;
   deploy the blockchain contract on a blockchain;
   generate a client-side application based on a plurality of second inputs and the interface specification associated with the blockchain contract, wherein the client-side application is executable to invoke the blockchain contract deployed on the blockchain and the instructions executable by the processor to cause the system to generate the client-side application comprises instructions executable by the processor to cause the system to:
      generate an object associated with the blockchain contract based on the interface specification, wherein the object comprises one or more methods associated with the interface specification;
      obtain the plurality of second inputs, wherein one or more of the second inputs comprises source code invoking the one or more methods associated with the interface specification; and
      include the object associated with the blockchain contract and the source code in the client-side application; and
   store the client-side application in an online storage system.

19. The medium of claim 12, wherein the generating a client-side application comprises:
   integrating a software development kit (SDK) associated with the blockchain in the client-side application.

20. The medium of claim 12, wherein:
   one or more of the second inputs comprise one or more references to one or more blockchain-based programs associated with the blockchain; and
   the client-side application is executable to invoke the one or more blockchain-based programs.

* * * * *